United States Patent
Yeh (12)

(10) Patent No.: US 6,494,347 B1
(45) Date of Patent: Dec. 17, 2002

(54) GREASE GUN HAVING AUTOMATIC CONTINUOUS FEEDING DEVICE

(76) Inventor: Kuo-Chung Yeh, 43-2, Wa Tsuo, Kuo Kou Community, Tai Bao City, Jia Yi Hsien (TW)

(*) Notice: Subject to any disclaimer, the term of this patent is extended or adjusted under 35 U.S.C. 154(b) by 0 days.

(21) Appl. No.: 10/012,719

(22) Filed: Nov. 5, 2001

(51) Int. Cl.⁷ .................................................. G01F 11/00
(52) U.S. Cl. .................. 222/262; 222/334; 222/389; 222/394; 184/29; 184/42; 184/55.1; 184/105.2
(58) Field of Search .................. 222/258, 262, 222/334, 389, 394, 397, 399; 184/29, 42, 45.1, 55.1, 105.2

(56) References Cited

U.S. PATENT DOCUMENTS

| | | | | |
|---|---|---|---|---|
| 2,183,013 A | * | 12/1939 | Davis | 137/605 |
| 2,505,839 A | * | 5/1950 | Scovell | 222/262 |
| 2,928,574 A | * | 3/1960 | Wagner | 222/108 |
| 5,067,591 A | * | 11/1991 | Fehlig | 141/21 |
| 5,474,214 A | * | 12/1995 | Chung et al. | 222/262 |
| 5,779,105 A | * | 7/1998 | Brown et al. | 222/262 |

* cited by examiner

*Primary Examiner*—J. Casimer Jacyna
(74) *Attorney, Agent, or Firm*—Alan Kamrath; Rider, Bennett, Egan & Arundel, LLP

(57) ABSTRACT

The present invention relates to a grease gun having an automatic continuous feeding device, including a gun body, a piston chamber, a piston, a spring, a barrel chamber, a plunger, a container, a switch valve, and a trigger. Thus, the piston may be moved reciprocally and automatically by pressing the trigger successively, so that the grease in the container may be ejected outward continuously without having to compress and loosen the trigger repeatedly, thereby facilitating the user operating the grease gun.

6 Claims, 7 Drawing Sheets

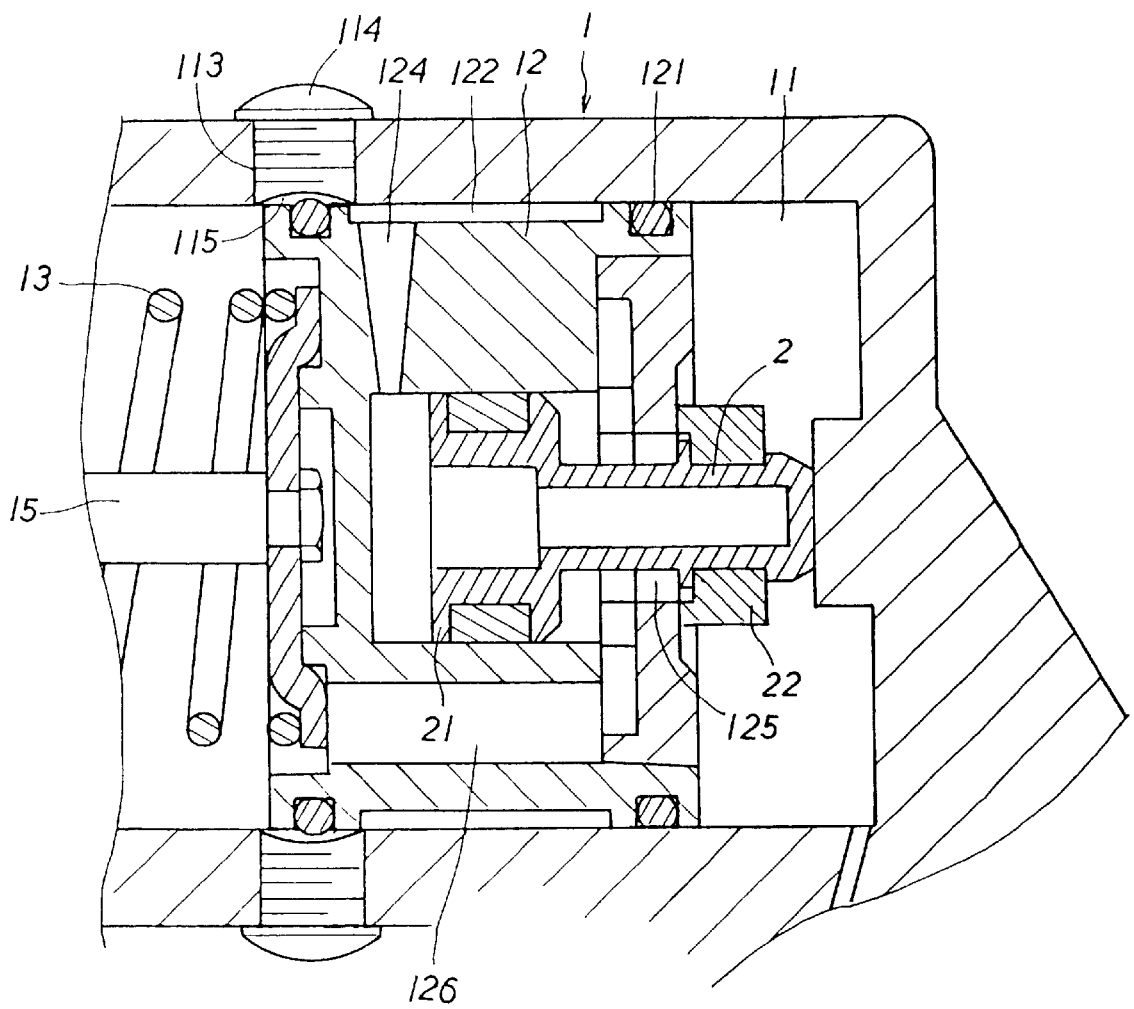
F I G. 7

GREASE GUN HAVING AUTOMATIC CONTINUOUS FEEDING DEVICE

BACKGROUND OF THE INVENTION

1. Field of the Invention

The present invention relates to a grease gun, and more particularly to a grease gun having an automatic continuous feeding device.

2. Description of the Related Art

A conventional pneumatic feeding type grease gun in accordance with the prior art shown in FIG. 1 comprises a gun body 2, a piston 21 mounted in the gun body 2, a spring 22 mounted in the gun body 2 for pushing the piston 21, and a plunger 23 mounted on the front end of the spring 22, so that the plunger 2 may be moved in the barrel 20. A container 24 is mounted on the gun body 2. A piston 26 is mounted in the container 24, and is pushed by a spring 25, so that the grease contained in the container 24 may be pushed to enter the barrel 20, and may then be pushed outward by the plunger 23. The gun body 2 has a handgrip 27 provided with an air inlet conduit 28 connected to the piston 21. A switch valve 29 is mounted on the air inlet conduit 28, and may be pressed by a trigger 291, so that the switch valve 29 may be opened or closed.

Before operation, the grease contained in the container 24 may be pushed by the piston 26 to enter the barrel 20. When the trigger 291 is pressed, the switch valve 29 is opened, whereby air of a high pressure may enter the gun body 2 through the air inlet conduit 28, to push the piston 21 which pushes the plunger 23 which may push the grease in the barrel 20 outward, thereby ejecting the grease outward. When the force on the trigger 291 is removed, the switch valve 29 is closed, whereby the air inlet conduit 28 is closed, and the air of a high pressure is released, so that the piston 21 is returned to its original position by pushing of the spring 22. Thus, the piston 21 may be successively moved forward and backward by pressing the trigger 291 repeatedly, so that the grease in the container 24 may be pushed outward intermittently.

However, the user has to press the trigger 291 successively so as to push the grease outward continuously, thereby causing inconvenience to the user in operation.

SUMMARY OF THE INVENTION

The present invention has arisen to mitigate and/or obviate the disadvantage of the conventional pneumatic feeding type grease gun.

The primary objective of the present invention is to provide a grease gun having an automatic continuous feeding device, wherein the piston may be moved reciprocally and automatically, such that the grease may be ejected outward continuously, without having to compress and loosen the trigger repeatedly, thereby facilitating the user operating the grease gun.

In accordance with the present invention, there is provided a grease gun having an automatic continuous feeding device, comprising:

a gun body formed with a piston chamber, a piston mounted in the piston chamber, a spring mounted in a front side of the piston chamber for pushing the piston, a barrel chamber formed in a front end of the gun body, and communicated between the front side of the piston chamber and an ambient environment, a plunger slidably mounted in the barrel chamber and having a distal end secured to a front end of the piston, a container secured to the front end of the gun body, and communicated with the barrel chamber, the gun body having a handgrip provided with an air inlet conduit connected to a rear side of the piston chamber, a switch valve mounted on the air inlet conduit, a trigger pivotally mounted on the gun body, and rested on a distal end of the switch valve; wherein:

the piston has two ends whose outer peripheries are provided with two sealing washers, so that the piston divides the piston chamber into a front side and a rear side, the piston has an outer periphery having a mediate portion formed with a recessed portion, the piston has an inner portion formed with a valve chamber, the piston is formed with a through hole that is communicated between the recessed portion and the valve chamber, a balance valve is mounted in the valve chamber, and has a first end provided With a piston portion mounted in the valve chamber and a second end provided with a valve portion that may seal a valve port of the valve chamber, a conduit is formed in the piston, and may connect the two sides of the piston chamber after the valve port of the valve chamber is opened, the piston chamber has a predetermined position provided with an air guide groove, whereby when the piston is moved in the piston chamber to the predetermined position of the piston chamber, one of the two sealing washers on the piston may align with the air guide groove, and an air drain hole is formed in the front end of the gun body, and is communicated between the front side of the piston chamber and an ambient environment; and wherein:

when the sealing washer at the rear end of the piston aligns with the air guide groove, a gap is formed between the outer wall of the piston and the inner wall of the piston chamber, so that air of a high pressure may enter the recessed portion of the piston through the air guide groove, and may enter the valve chamber in the piston through the through hole to push the balance valve in the valve chamber to move outward, so as to move the valve portion of the balance valve outward, thereby opening the valve port of the valve chamber, so that the front side and the rear side of the piston chamber at the two sides of the piston may communicate with each other through the valve chamber and the conduit;

the air of a high pressure in the rear side of the piston chamber may be drained outward to the ambient environment through the air drain hole, so that the pressure in the two sides of the piston chamber may be balanced, whereby the pushing force on the piston may be released, so that the piston may be pushed by the spring to move backward;

when the piston is moved backward to the rear side of the piston chamber, the valve portion of the balance valve hits the wall of the rear side of the piston chamber, thereby returning the balance valve to its original position, so that the valve portion of the balance valve may close the valve port of the valve chamber, and so that the air of a high pressure entering the rear side of the piston chamber through the air inlet conduit may push the piston to move forward again.

Further benefits and advantages of the present invention will become apparent after a careful reading of the detailed description with appropriate reference to the accompanying drawings.

BRIEF DESCRIPTION OF THE DRAWINGS

FIG. 7 is a partially cut-away cross-sectional assembly view of a grease gun having an automatic continuous feeding device in accordance with a fourth embodiment of the present invention.

DETAILED DESCRIPTION OF THE INVENTION

Figure 1:
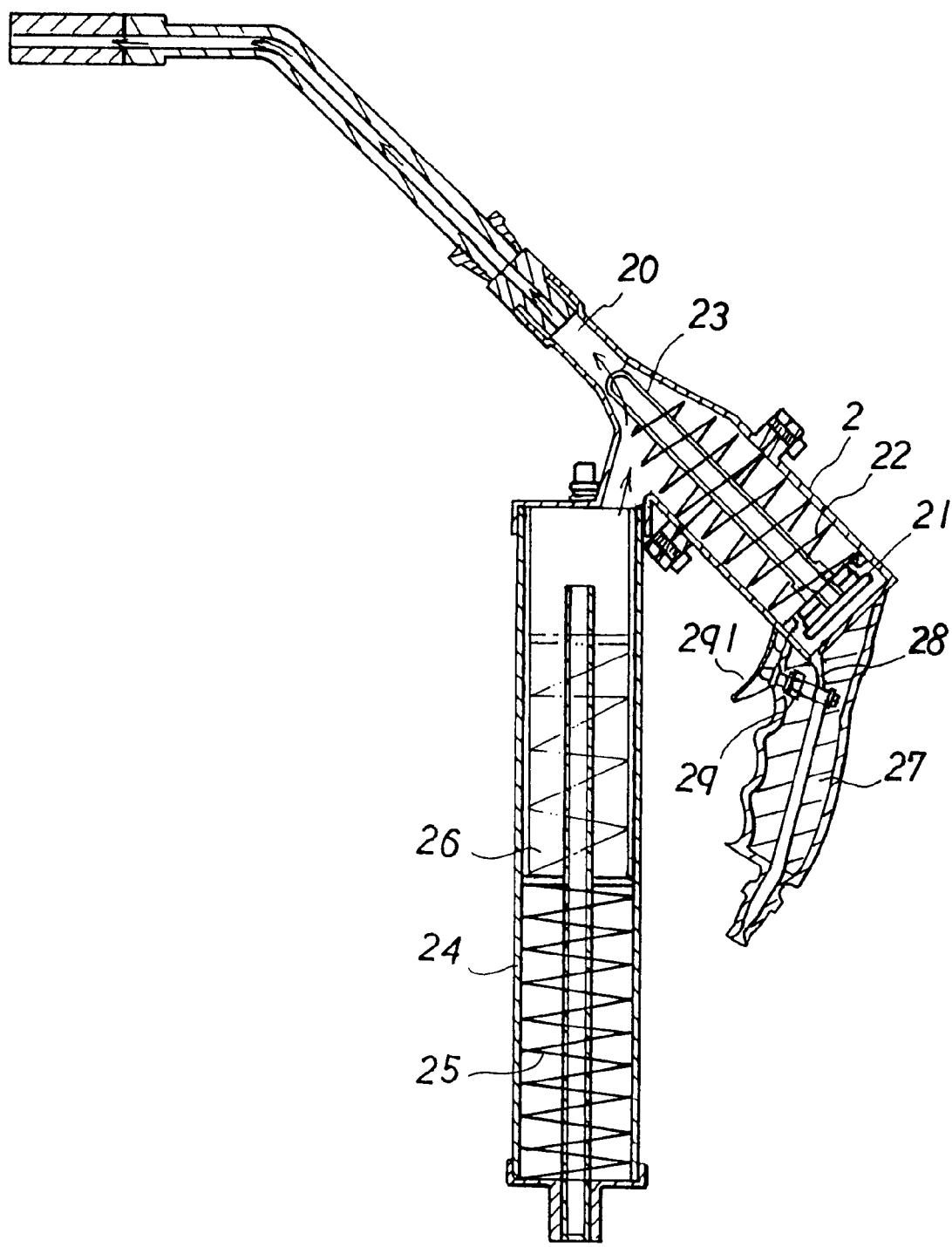
FIG. 1 is a plan cross-sectional view of a conventional pneumatic feeding type grease gun in accordance with the prior art.
Figure 2:
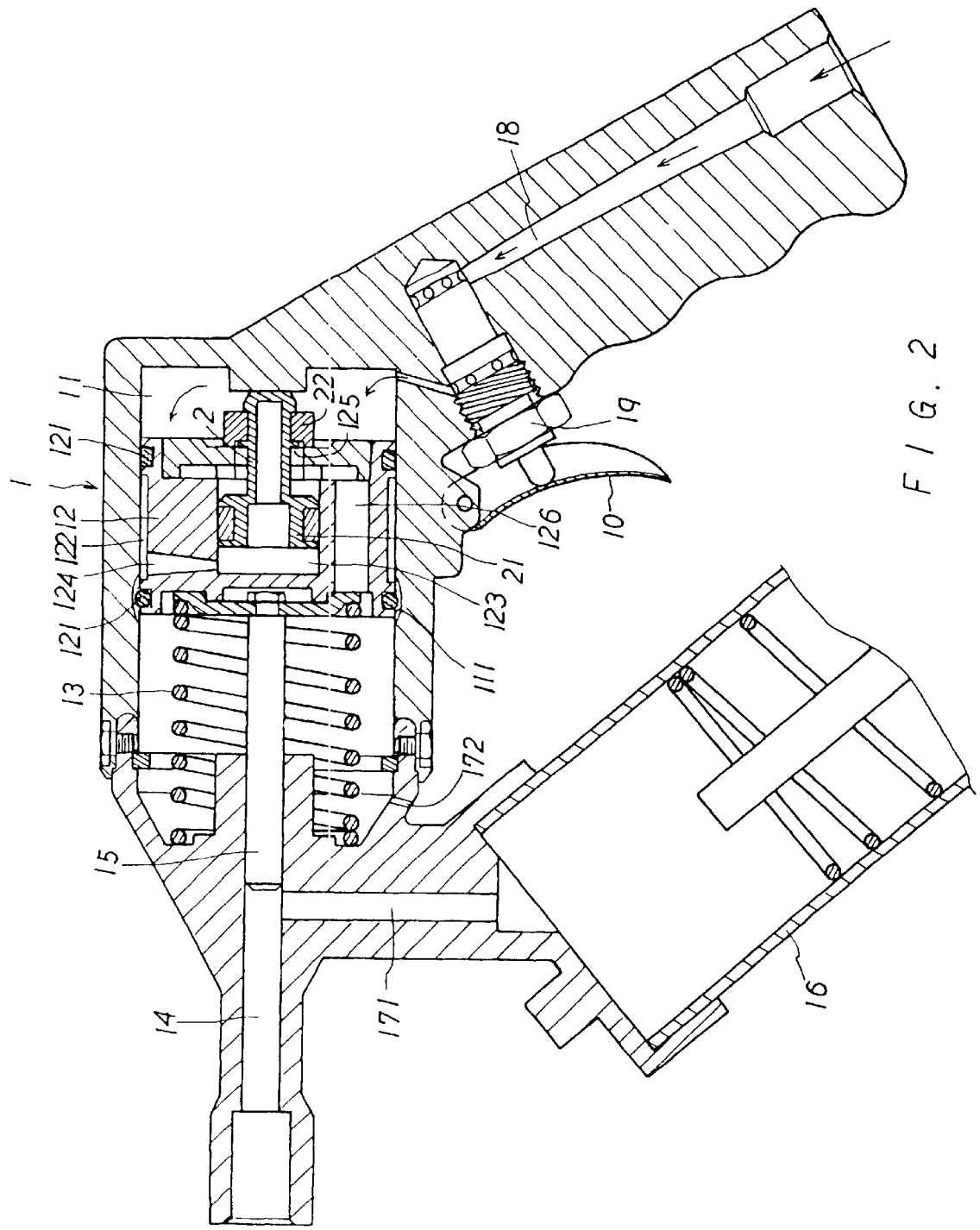
FIG. 2 is a cross-sectional assembly view of a grease gun having an automatic continuous feeding device in accordance with a first embodiment of the present invention.
Figure 3:
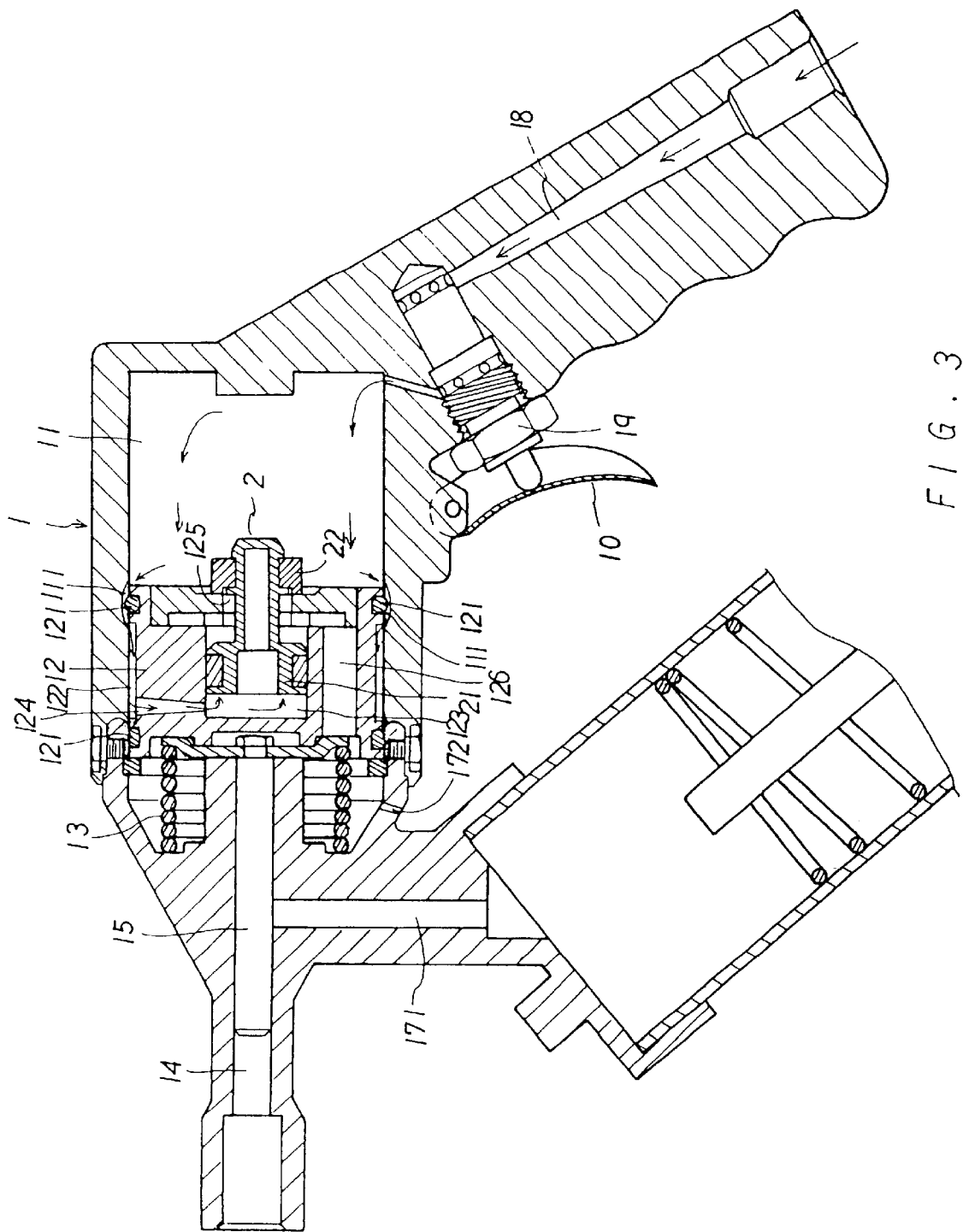
FIG. 3 is a schematic operational view of the grease gun having an automatic continuous feeding device as shown in FIG. 2 in use.
Figure 4:
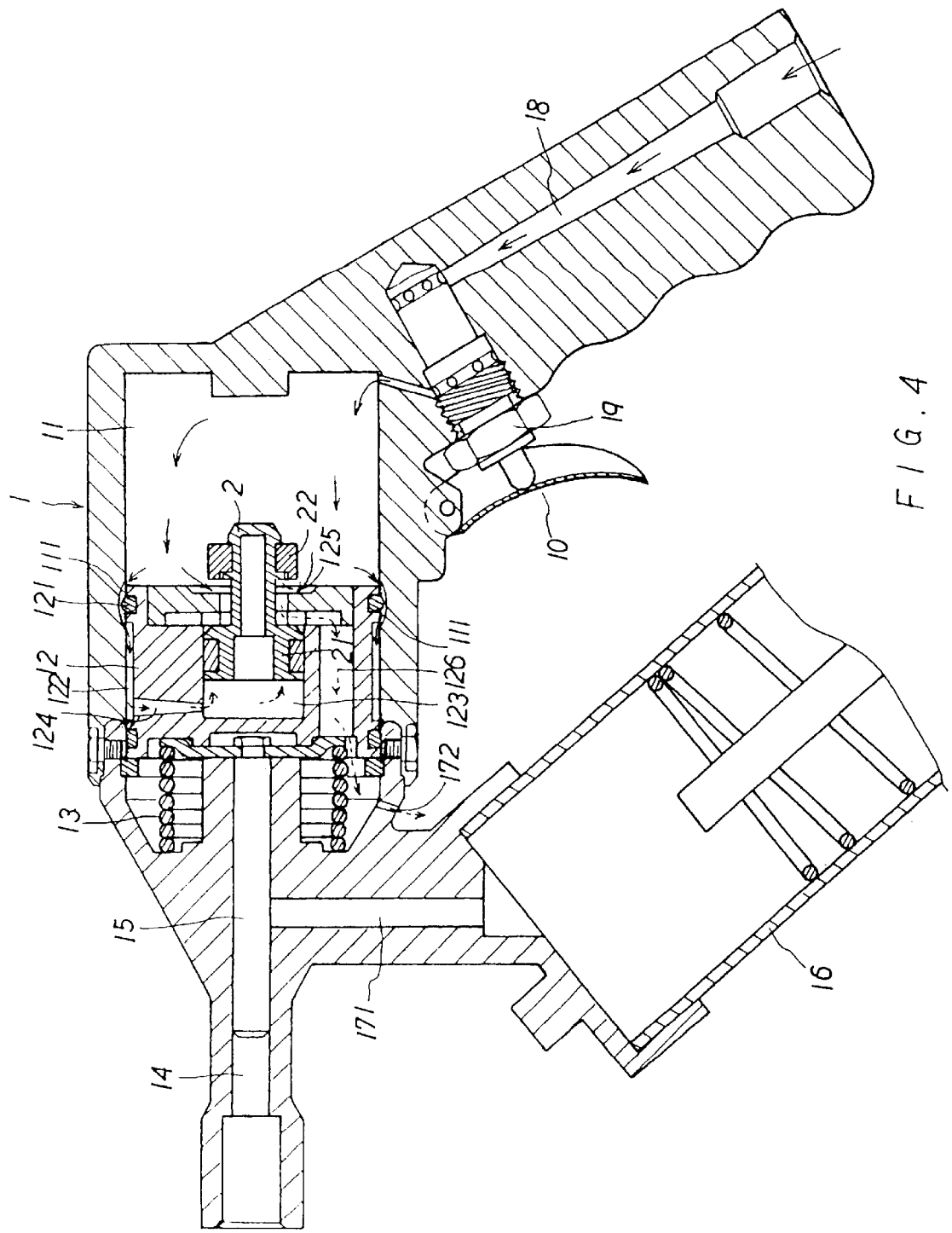
FIG. 4 is a schematic operational view of the grease gun having an automatic continuous feeding device as shown in FIG. 2 in use.

Referring to the drawings and initially to FIGS. 2–4, a grease gun having an automatic continuous feeding device in accordance with the first embodiment of the present invention comprises a gun body 1 formed with a piston chamber 11, a piston 12 mounted in the piston chamber 11, a spring 13 mounted in a front side of the piston chamber 11 for pushing the piston 12, a barrel chamber 14 formed in a front end of the gun body 1, and communicated between the front side of the piston chamber 11 and an ambient environment, and a plunger 15 slidably mounted in the barrel chamber 14 and having a distal end secured to a front end of the piston 12.

A container 16 is secured to the front end of the gun body 1. The structure of the container 16 is conventional, and will not be further described in detail. A passage 171 is formed in the front end of the gun body 1 to connect the container 16 to the barrel chamber 14.

The gun body 1 has a handgrip (not labeled) provided with an air inlet conduit 18 connected to a rear side of the piston chamber 11. A switch valve 19 is mounted on the air inlet conduit 18. A trigger 10 is pivotally mounted on the gun body 1, and is rested on a distal end of the switch valve 19 which may be pressed by the trigger 10, so that the switch valve 19 may be opened or closed.

The piston 12 has two ends whose outer peripheries are provided with two sealing washers 121, so that the piston 12 may be freely moved in the piston chamber 11, and may divide the piston chamber 11 into a front side and a rear side. The piston 12 has an outer periphery having a mediate portion formed with a recessed portion 122. The piston 12 has an inner portion formed with a valve chamber 123. The piston 12 is formed with a through hole 124 communicated between the recessed portion 122 and the valve chamber 123.

A balance valve 2 is mounted in the valve chamber 123, and has a first end provided with a piston portion 21 mounted in the valve chamber 123 and a second end provided with a valve portion 22 that may seal a valve port 125 of the valve chamber 123. A conduit 126 is formed in the piston 12 located adjacent to the valve port 125, and is connected to the valve chamber 123 and to the front side of the piston chamber 11. Thus, when the valve portion 22 opens the valve port 125, the front side and the rear side of the piston chamber 11 at the two sides of the piston 12 may communicate with each other.

The piston chamber 11 has a predetermined position provided with an air guide groove 111, whereby when the piston 12 is moved in the piston chamber 11 to the predetermined position of the piston chamber 11, one of the two sealing washers 121 on the piston 12 may align with the air guide groove 111. An air drain hole 172 is formed in the front end of the gun body 1, and is communicated between the front side of the piston chamber 11 and an ambient environment.

As shown in FIG. 3, before the trigger 10 is pressed, the grease in the container 16 may be conveyed into the barrel chamber 14 through the passage 171. The trigger 10 may be pressed to open the switch valve 19, so that the air of a high pressure may enter the rear side of the piston chamber 11 through the air inlet conduit 18, to move the piston 12 forward, which pushes the plunger 15 forward, so as to push the grease in the barrel chamber 14 outward, thereby ejecting the grease outward.

When the sealing washer 121 at the rear end of the piston 12 aligns with the air guide groove 111 as shown in FIG. 3, a gap is formed between the outer wall of the piston 12 and the inner wall of the piston chamber 11, so that the air of a high pressure may enter the recessed portion 122 of the piston 12 through the air guide groove 111, and may then enter the valve chamber 123 in the piston 12 through the through hole 124 to push the balance valve 2 in the valve chamber 123 to move outward, so as to move the valve portion 22 of the balance valve 2 outward, thereby opening the valve port 125 of the valve chamber 123 as shown in FIG. 4, so that the front side and the rear side of the piston chamber 11 at the two sides of the piston 12 may communicate with each other through the valve chamber 123 and the conduit 126.

In such a manner, after the valve portion 22 of the balance valve 2 is opened, the air of a high pressure in the rear side of the piston chamber 11 may enter the front side of the piston chamber 11 through the conduit 26, and may then be drained outward to the ambient environment through the air drain hole 172.

Thus, the pressure in the two sides of the piston chamber 11 may be balanced, whereby the pushing force on the piston 12 may be released, so that the piston 12 may be pushed by the spring 13 to move backward.

When the piston 12 is moved backward to the rear side of the piston chamber 11, the valve portion 22 of the balance valve 2 will hit the wall of the rear side of the piston chamber 11, thereby returning the balance valve 2 to its original position, so that the valve portion 22 of the balance valve 2 may close the valve port 125 of the valve chamber 123 as shown in FIG. 2. Thus, the air of a high pressure entering the rear side of the piston chamber 11 through the air inlet conduit 18 may push the piston 12 to move forward again.

At the same time, after the piston 12 is moved backward in the piston chamber 11 to a predetermined position of the piston chamber 11, the sealing washer 121 at the front end of the piston 12 may align with the air guide groove 111, so that the air in the valve chamber 123, the through hole 124, the conduit 126 and the recessed portion 122 may be squeezed by the balance valve 2 that is moved backward, and may then be pushed into the front side of the piston chamber 11 through the air guide groove 111.

Then, the whole air in the front side of the piston chamber 11 may be drained outward through the air drain hole 172, such that piston 12 may be pushed forward conveniently to push the grease forward.

Thus, the above-mentioned action may be operated cyclically, the trigger 10 may be maintained at the compressed state, while the piston 12 may be moved reciprocally and automatically, such that the grease may be ejected outward continuously, without having to compress and loosen the trigger 10 repeatedly, thereby facilitating the user operating the grease gun.

Figure 5:
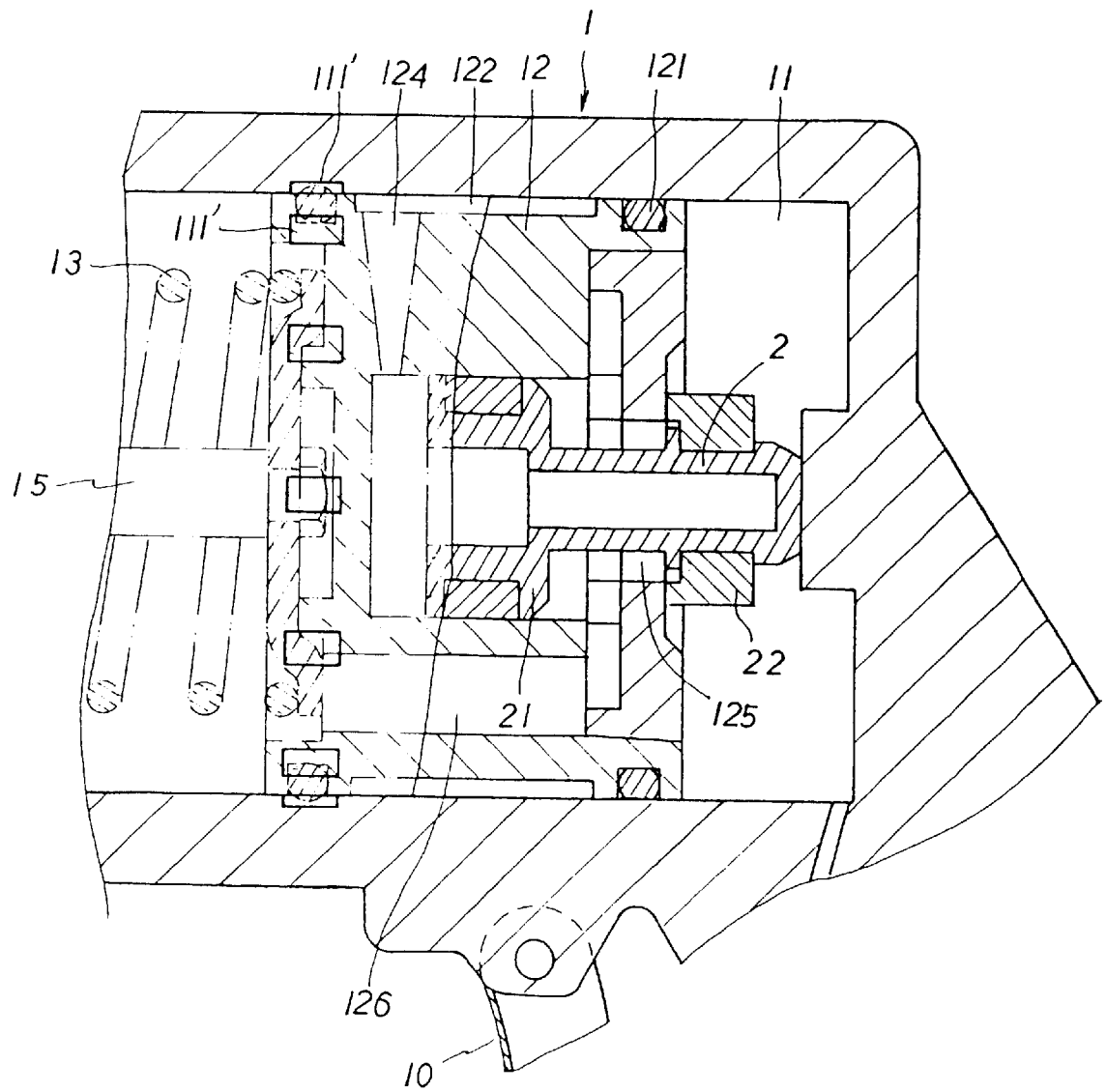
FIG. 5 is a partially cut-away cross-sectional assembly view of a grease gun having an automatic continuous feeding device in accordance with a second embodiment of the present invention.

Referring to FIG. 5, in accordance with the second embodiment of the present invention, multiple recessed air guide grooves 111' are arranged successively.

Figure 6:
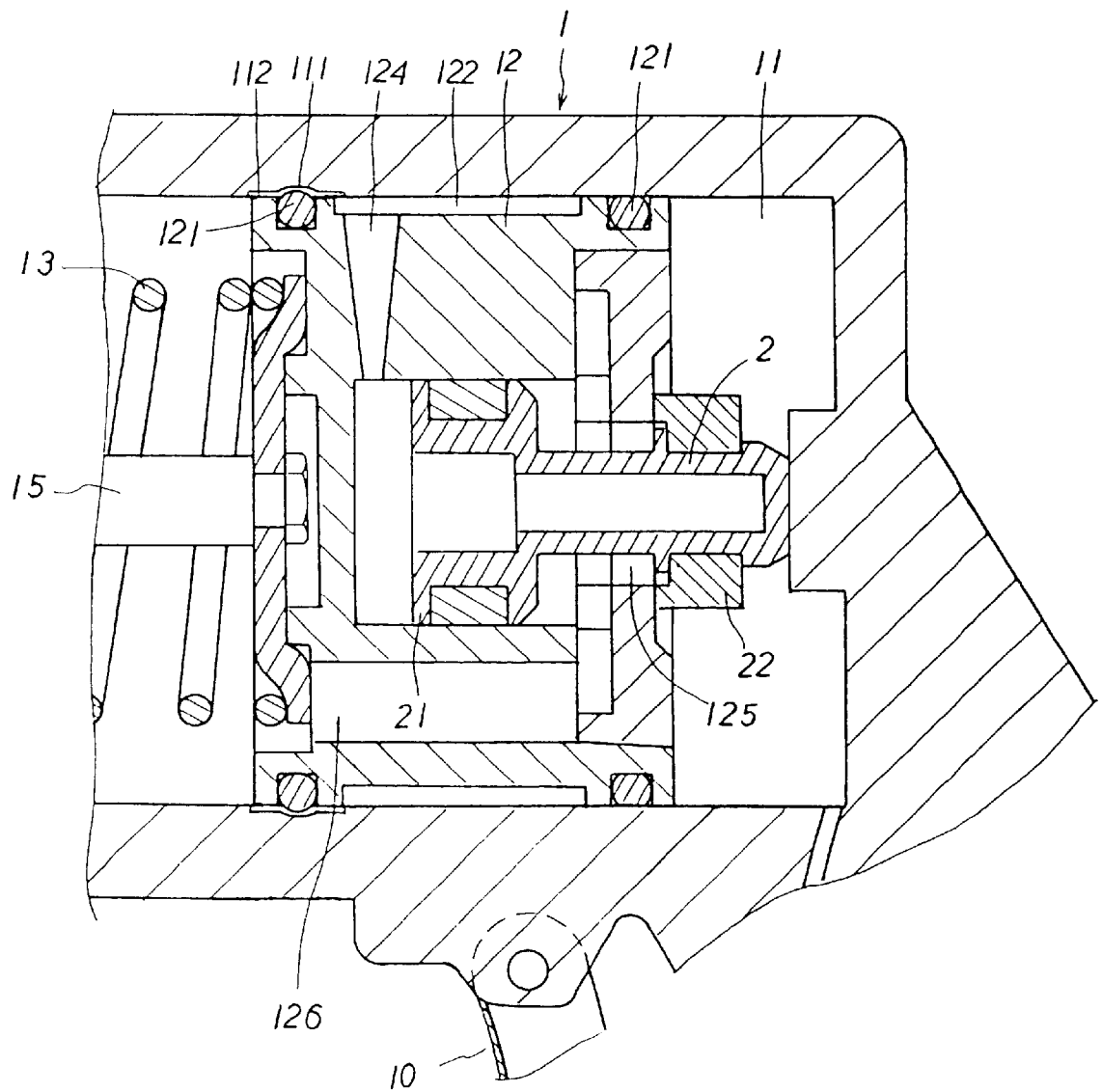
FIG. 6 is a partially cut-away cross-sectional assembly view of a grease gun having an automatic continuous feeding device in accordance with a third embodiment of the present invention.

Referring to FIG. 6, in accordance with the third embodiment of the present invention, the air guide groove 111 of the piston chamber 11 has two sides each formed with a depression 112.

Referring to FIG. 7, in accordance with the fourth embodiment of the present invention, the wall of the piston chamber 11 is formed with multiple screw holes 113 each of which is screwed with a screw 114 which has an end face formed with a concave portion 115, thereby forming the air guide groove.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A grease gun having an automatic continuous feeding device, comprising:

a gun body formed with a piston chamber, a piston mounted in the piston chamber, a spring mounted in a front side of the piston chamber for pushing the piston, a barrel chamber formed in a front end of the gun body, and communicated between the front side of the piston chamber and an ambient environment, a plunger slidably mounted in the barrel chamber and having a distal end secured to a front end of the piston, a container secured to the front end of the gun body, and communicated with the barrel chamber, the gun body having a handgrip provided with an air inlet conduit connected to a rear side of the piston chamber, a switch valve mounted on the air inlet conduit, a trigger pivotally mounted on the gun body, and rested on a distal end of the switch valve; wherein:

the piston has two ends whose outer peripheries are provided with two sealing washers, so that the piston divides the piston chamber into a front side and a rear side, the piston has an outer periphery having a mediate portion formed with a recessed portion, the piston has an inner portion formed with a valve chamber, the piston is formed with a through hole that is communicated between the recessed portion and the valve chamber, a balance valve is mounted in the valve chamber, and has a first end provided with a piston portion mounted in the valve chamber and a second end provided with a valve portion that may seal a valve port of the valve chamber, a conduit is formed in the piston, and may connect the two sides of the piston chamber after the valve port of the valve chamber is opened, the piston chamber has a predetermined position provided with an air guide groove, whereby when the piston is moved in the piston chamber to the predetermined position of the piston chamber, one of the two sealing washers on the piston may align with the air guide groove, and an air drain hole is formed in the front end of the gun body, and is communicated between the front side of the piston chamber and an ambient environment; and wherein:

when the sealing washer at the rear end of the piston aligns with the air guide groove, a gap is formed between the outer wall of the piston and the inner wall of the piston chamber, so that air of a high pressure may enter the recessed portion of the piston through the air guide groove, and may enter the valve chamber in the piston through the through hole to push the balance valve in the valve chamber to move outward, so as to move the valve portion of the balance valve outward, thereby opening the valve port of the valve chamber, so that the front side and the rear side of the piston chamber at the two sides of the piston may communicate with each other through the valve chamber and the conduit;

the air of a high pressure in the rear side of the piston chamber may be drained outward to the ambient environment through the air drain hole, so that the pressure in the two sides of the piston chamber may be balanced, whereby the pushing force on the piston may be released, so that the piston may be pushed by the spring to move backward;

when the piston is moved backward to the rear side of the piston chamber, the valve portion of the balance valve hits the wall of the rear side of the piston chamber, thereby returning the balance valve to its original position, so that the valve portion of the balance valve may close the valve port of the valve chamber, and so that the air of a high pressure entering the rear side of the piston chamber through the air inlet conduit may push the piston to move forward again.

2. The grease gun having an automatic continuous feeding device in accordance with claim 1, wherein the front end of the gun body is formed with a passage to connect the container to the barrel chamber 14.

3. The grease gun having an automatic continuous feeding device in accordance with claim 1, wherein the conduit formed in the piston is located adjacent to the valve port, and is connected to the valve chamber and the front side of the piston chamber.

4. The grease gun having an automatic continuous feeding device in accordance with claim 1, wherein multiple recessed air guide grooves are formed in the piston chamber, and are arranged successively.

5. The grease gun having an automatic continuous feeding device in accordance with claim 1, wherein the air guide groove of the piston chamber has two sides each formed with a depression.

6. The grease gun having an automatic continuous feeding device in accordance with claim 1, wherein the wall of the piston chamber is formed with multiple screw holes each of which is screwed with a screw which has an end face formed with a concave portion, thereby forming the air guide groove.

* * * * *